(12) United States Patent
Battle et al.

(10) Patent No.: US 12,736,382 B2
(45) Date of Patent: Sep. 15, 2026

(54) MEASURED FLUID DISPENSER WITH ROTATABLE FILLABLE VOLUMES

(71) Applicant: AMS LLC, Canton, OH (US)

(72) Inventors: Matthew Battle, Canton, OH (US); Adrian Bischoff, Chapel Hill, NC (US)

(73) Assignee: AMS LLC, Canton, OH (US)

(*) Notice: Subject to any disclaimer, the term of this patent is extended or adjusted under 35 U.S.C. 154(b) by 66 days.

(21) Appl. No.: 19/055,374

(22) Filed: Feb. 17, 2025

(65) Prior Publication Data

US 2025/0264351 A1 Aug. 21, 2025

Related U.S. Application Data

(60) Provisional application No. 63/555,234, filed on Feb. 19, 2024.

(51) Int. Cl.
*G01F 19/00* (2006.01)
*B65D 35/24* (2006.01)
*G01F 11/28* (2006.01)

(52) U.S. Cl.
CPC ............. *G01F 19/00* (2013.01); *B65D 35/24* (2013.01); *G01F 11/28* (2013.01); *G01F 11/286* (2013.01)

(58) Field of Classification Search
CPC ...... B65D 35/24; B65D 35/242; B65D 35/26; G01F 19/00; G01F 11/28; G01F 11/286; G01F 11/288; G01F 11/263; G01F 11/30; G01F 11/32; G01F 11/42; G01F 11/44; A61J 7/0046; A61J 1/22
USPC .......... 222/92, 207, 211, 212, 213, 424, 548
See application file for complete search history.

(56) References Cited

U.S. PATENT DOCUMENTS 4,747,521 A * 5/1988 Saffron ................ G01F 11/286 222/207
6,186,367 B1 * 2/2001 Harrold ................ B05B 11/047 222/481.5

* cited by examiner

*Primary Examiner* — David J Walczak
(74) *Attorney, Agent, or Firm* — Renner, Otto, Boisselle & Sklar, LLP

(57) ABSTRACT

An adjustable measured fluid dispenser is provided for dispensing a fluid from a storage container. The adjustable measured fluid dispenser is connected to the storage container, and a tube connects the dispenser to the storage container. The tube connects to a channel in a support cup, which in turn supports a nested measurement cup. The measurement cup contains fillable chambers which each contain a flow duct. The height of each flow duct determines a corresponding retained volume of each fillable chamber. The fluid dispenser operates when the storage container is constricted, causing fluid to flow up the tube, through the channel, and out of the flow duct to fill the fillable chamber in excess of the retained volume. When the constriction on the storage container is relaxed, the excess fluid flows back through the flow duct leaving only the retained volume of fluid behind in the fluid dispenser.

20 Claims, 14 Drawing Sheets

MEASURED FLUID DISPENSER WITH ROTATABLE FILLABLE VOLUMES

RELATED APPLICATIONS

This application claims the benefit of U.S. Patent Application No. 63/555,234 filed on Feb. 19, 2024, which is hereby incorporated herein by reference in its entirety.

TECHNICAL FIELD

The present disclosure relates generally to fluid dispensers, and more particularly to a fluid dispenser for measuring and dispensing fluid contained in a container.

BACKGROUND

There are many ways to measure fluid from a container. One such conventional way is by using a measuring cup including delineated markers along the side of the cup to visually indicate to a user how much fluid is contained therein and dispensed from a bottle. The delineations on measuring cups are often very small and integrally formed into the plastic, which may cause some users difficulty in visually seeing the demarcations on the cup, and which could result in an improper dosage of medicine.

SUMMARY

The present disclosure provides an adjustable measured fluid dispenser for dispensing a fluid from a storage container into one of multiple chambers of a measurement cup with each chamber including a flow duct having a height that determines a maximum retained volume of fluid retained in the chamber. That is, within a chamber, fluid in excess of the maximum retained volume drains back through the flow duct into the storage container leaving the maximum retained volume in the measured fluid dispenser.

The disclosed fluid dispenser provides the exemplary benefit of allowing a user of the dispenser apparatus to precisely select a target volume of fluid and then dispense that volume of fluid in a rapid and accurate manner. The disclosed dispenser also reduces waste by preventing excess (beyond the target volume) fluid from being dispensed, and thereby prevents improper dosage (of medicine or a beverage, for example).

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects of the present disclosure have particular application to fluid dispensers for use with liquid medications and beverages, and thus will be described below chiefly in this context. It is understood, however, that the principles and aspects of the present disclosure may be applicable for other applications for other types of fluids where it is desirable to measure and dispense a preselected quantity of fluid from a container with improved accuracy and ease.

The present disclosure provides an adjustable measured fluid dispenser for dispensing a fluid (e.g., liquid medicine) from a storage chamber (e.g., a liquid medicine bottle). The fluid dispenser includes a support cup that engages with the neck of the storage chamber and receives a measurement cup. The measurement cup includes multiple divided fillable chambers that are rotatably positionable within the support cup, such that one of the fillable chambers aligns with a channel in the support cup providing a fluid passage from liquid in the storage chamber to the fillable chamber of the measurement cup. Each of the fillable chambers includes a flow duct having a height that defines a maximum retained volume of the fillable chamber. When the liquid inside one of the fillable chambers exceeds the height of the flow duct, the excess fluid flow back through the flow duct into the storage chamber.

Figure 1:
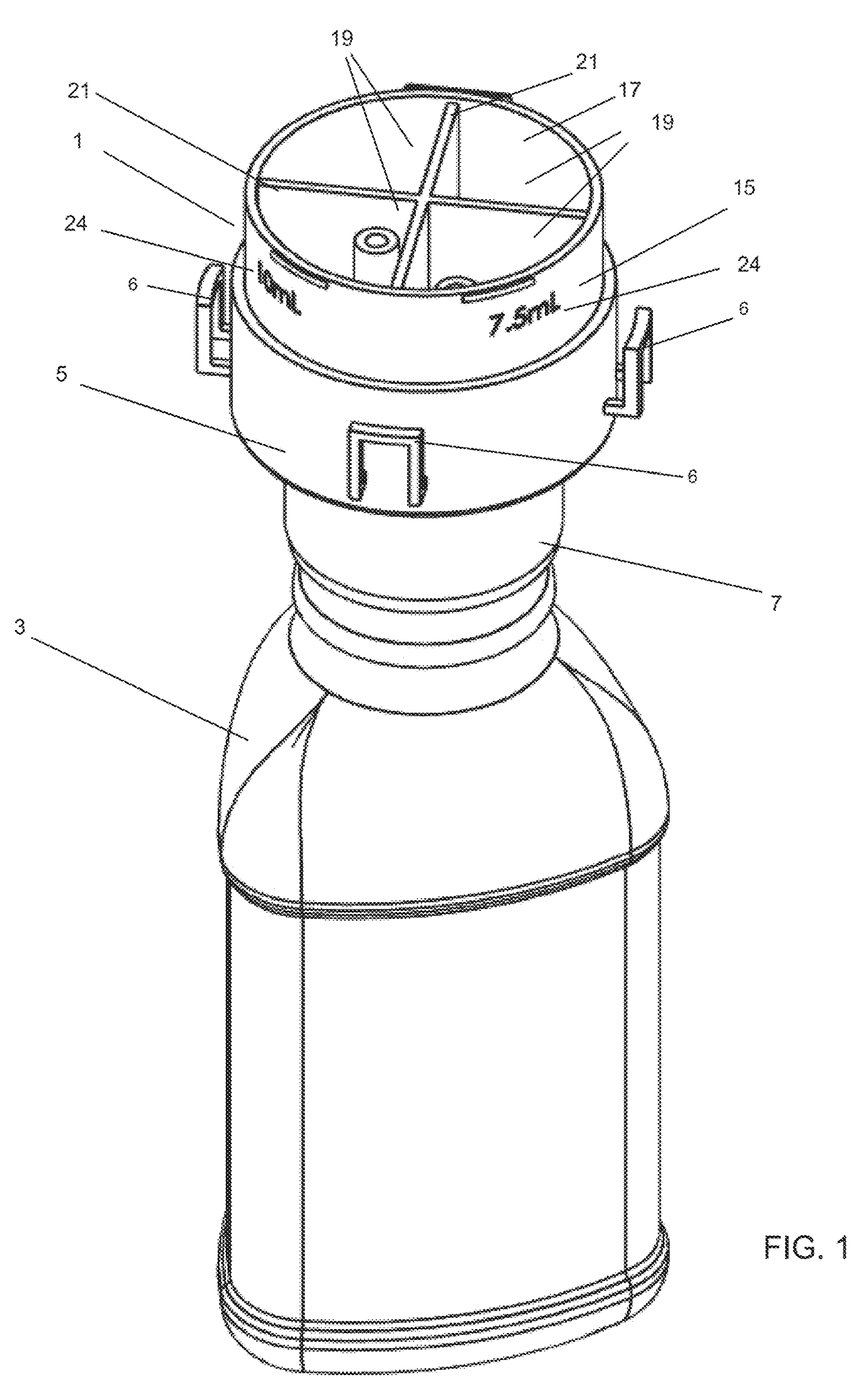
FIG. 1 is an elevated perspective view of an embodiment of the adjustable liquid medicine dispenser including an adjustable measured fluid dispenser attached to a storage container.
Figure 2:
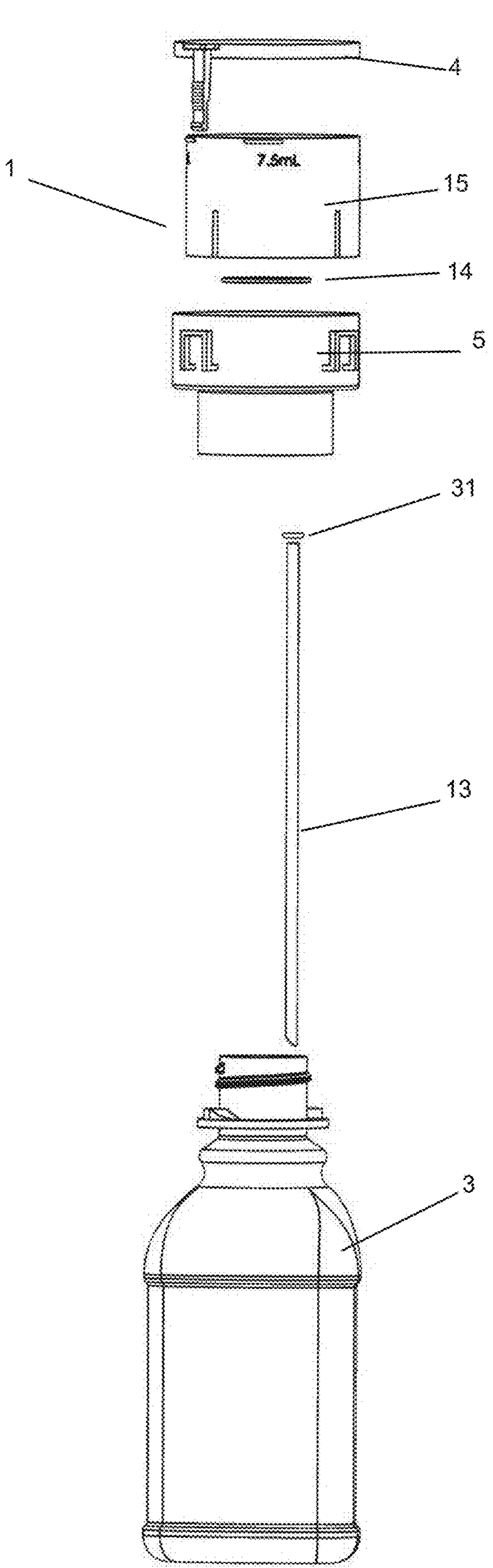
FIG. 2 is an exploded view of the fluid dispenser of FIG. 1.
Figure 3:
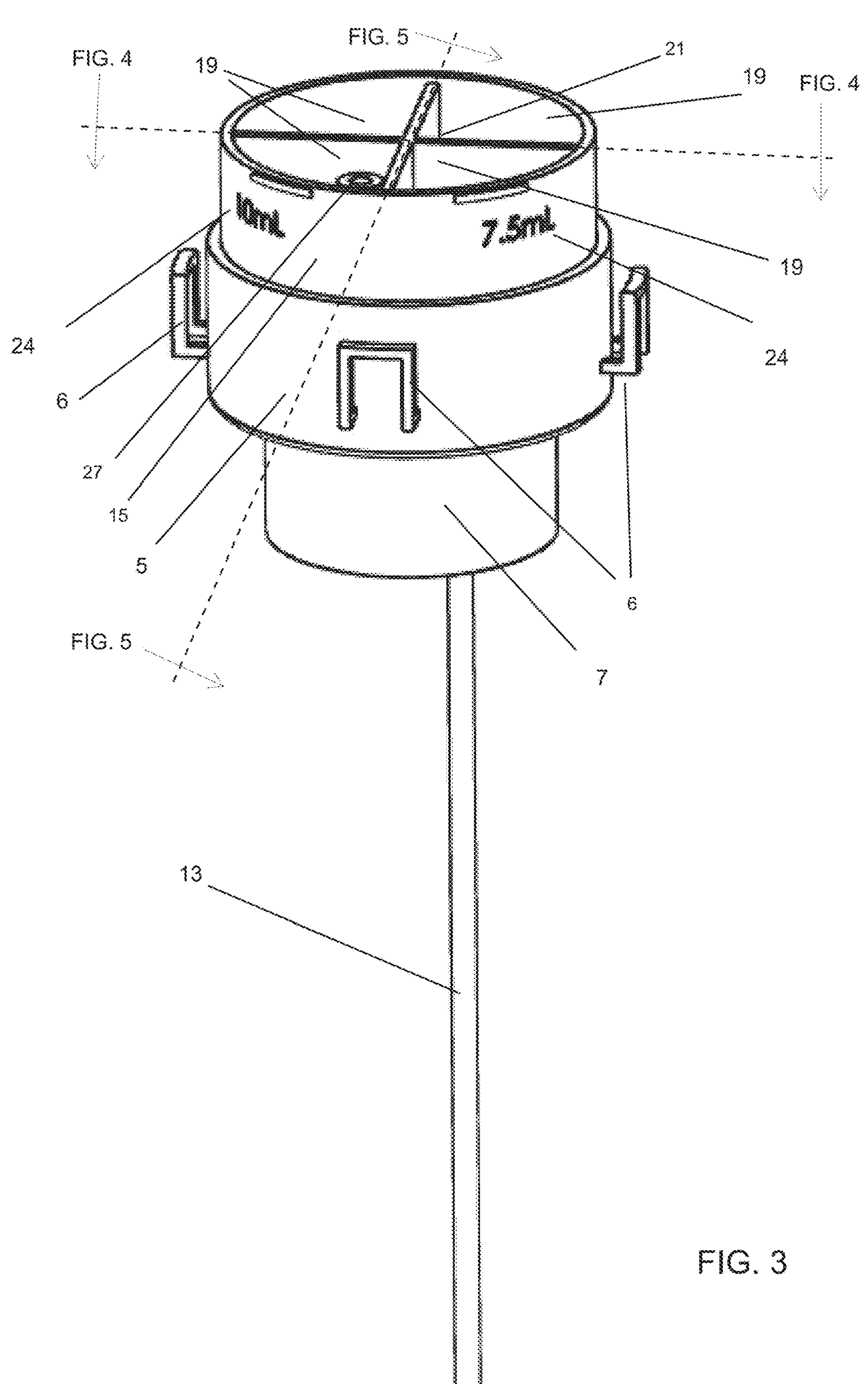
FIG. 3 is an elevated perspective view of an embodiment of the fluid dispenser without a storage container.

Referring now to FIGS. 1-3, an embodiment is shown of an adjustable measured fluid dispenser 1. The fluid dispenser 1 may include a support cup, a tube, and a measurement cup. The measurement cup 15 may be nested within the receiving chamber 10 of the support cup 5, such that the measurement cup 15 is rotatable within the receiving chamber 10. The measurement cup 15 may include a dividing wall 21 which separates the measurement chamber 17 into fillable chambers 19 within the measurement chamber 17.

Figure 5:
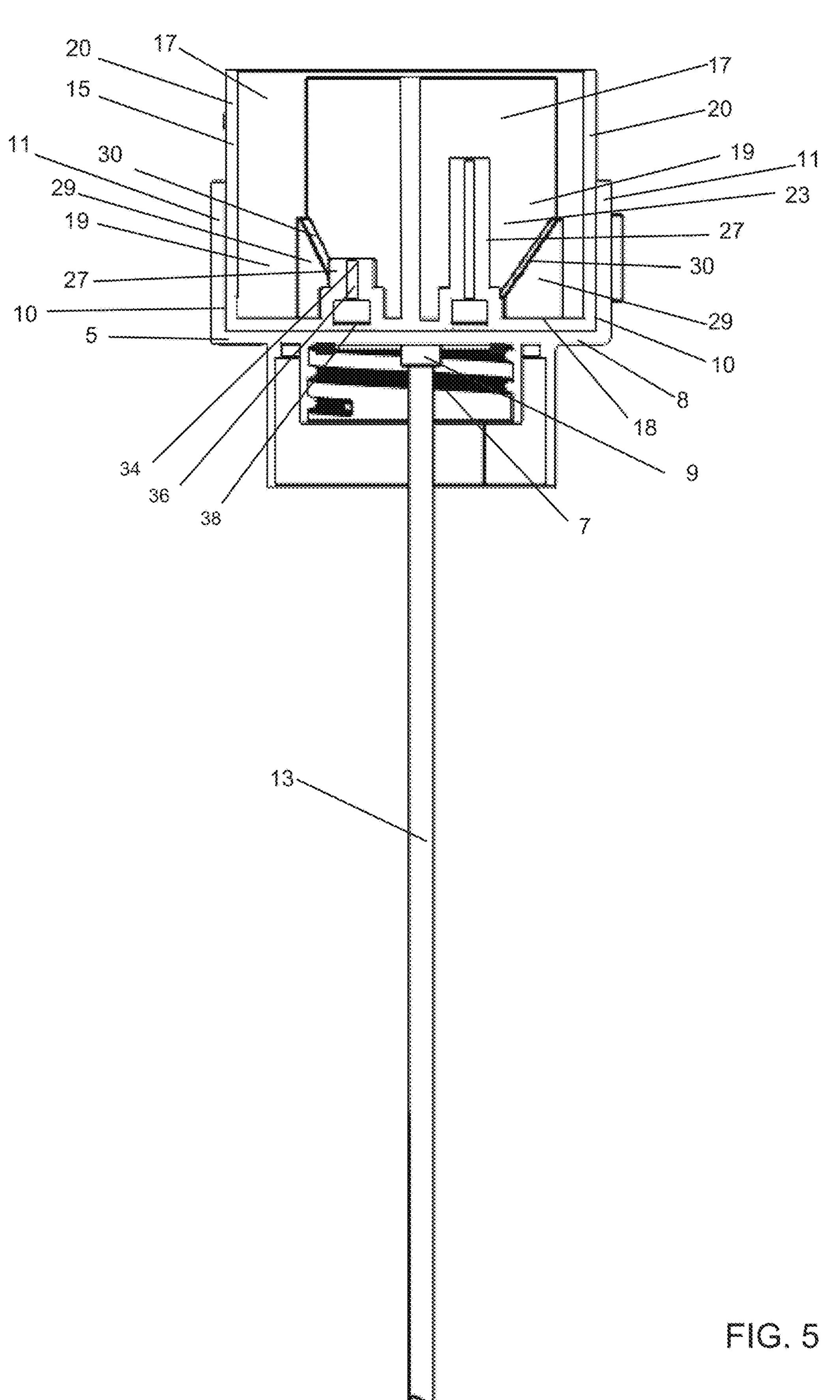
FIG. 5 is a second front cross-sectional view of FIG. 3 which shows two separate fillable volumes within the measurement cup that are not rotationally aligned into a dispensing position.

As shown in FIG. 5, each fillable chamber 19 includes a flow duct 27 (e.g., extending from the floor 18 of the fillable chamber 19). Each flow duct may include a chamber fluid opening 34 located at a height in the fillable chamber 19, an external fluid opening 38 configured to connect to the channel 10 of the support cup, and a flow duct conduit 36 extending between and fluidly connecting the external fluid opening 38 and the chamber fluid opening 34. The chamber fluid opening 34 may be configured to open into the interior of the fillable chamber 19 so that fluid traveling through the flow duct conduit of the dispenser 28 may exit the flow passage of the dispenser 28 and enter the fillable chamber 19.

The flow duct 27 provides a fluid passage into the fillable chamber 19 that it is located in. The height at which the chamber fluid opening 34 is positioned in the fillable chamber determines a maximum retained volume 41 of the fillable chamber. That is, the maximum retained volume 41 is defined for each fillable chamber 19 by the height of each fillable chamber's corresponding flow duct 27. The flow ducts 27 of the fillable chambers 19 may have different heights (resulting in different maximum retained volumes 41), or two or more of the flow ducts 27 may have the same height (resulting in two or more of the fillable chambers 19 having the same maximum retained volume 41).

Markings (not shown) may be inscribed on an interior surface of each fillable chamber 19 to denote the top of each retained volume 41 or to list the measured amount of each retained volume 41. A maximum capacity volume is defined for each fillable chamber 19 by the height of the dividing walls 21 and measurement cup walls 20 which define the fillable chamber 19.

Figure 4:
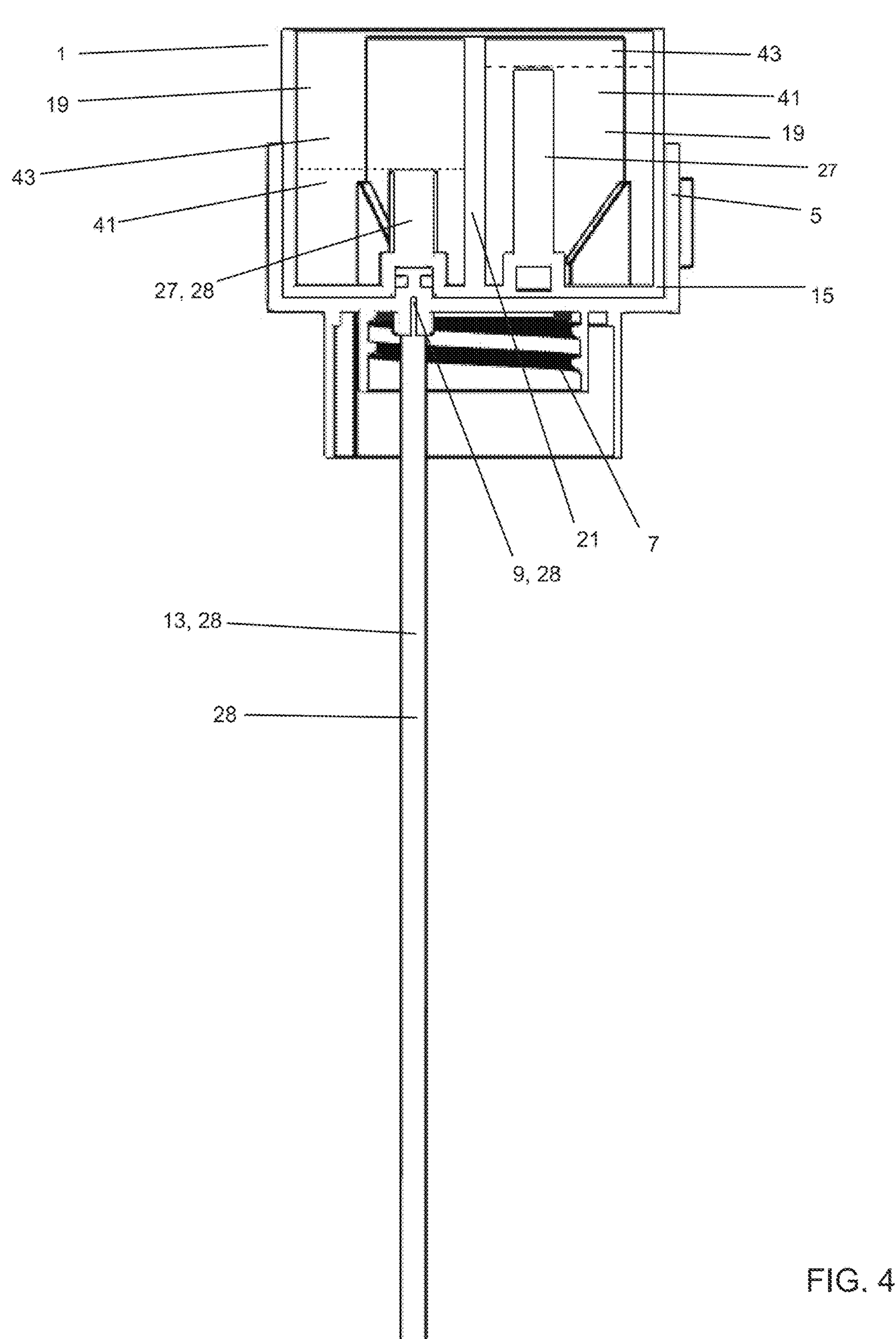
FIG. 4 is a first front cross-sectional view of FIG. 3 which shows two separate fillable volumes within the measurement cup, wherein one of the fillable volumes is rotationally aligned into a dispensing position with the channel of the support cup.

Referring now to FIGS. 4 and 5, the measurement cup 15 may be configured to rotate within the receiving chamber 10 of the support cup between at least two dispensing positions. Each dispensing position is defined as a rotational position within the support cup 5 where the external fluid opening of one of the flow ducts 27 aligns with the channel 10 and tube 13 of the support cup 5 to form a fluid flow passage 28. This fluid flow passage 28 fluidly connects the interior of the storage container to a fillable chamber of the measurement cup through the flow duct conduit of the aligned flow duct 27. The measurement cup 15 may be rotated to align different flow ducts 27 in different fillable chambers 15 to the channel 10. This allows a user of the liquid dispenser 1 to select and fill a specific selected fillable chamber 19 without filling any unselected fillable chamber(s) 19.

The fluid dispenser 1 may have at least two different dispensing positions which correspond to different rotational configurations of the measurement cup 15 within the support cup 5. A dispensing position occurs where a fluid flow passage 28 is formed by aligning the flow duct 27 of a fillable chamber 19 with the channel 9 of the support cup 5 and the tube 13. Dispensing positions may be selected between by the rotation of the measurement cup 15 within the receiving chamber 10 of the support cup 5. Each dispensing position is associated with a respective fillable chamber 19 such that the flow duct 27 of the associated fillable chamber 19 aligns with the channel 9 and fluidly connects the channel 9 of the support cup 5 and the associated fillable chamber 19. This allows a user of the liquid dispenser 1 to select and fill a specific selected fillable chamber 19 without filling any unselected fillable chamber(s) 19. An exemplary cross-sectional view of dispenser is shown in FIG. 4 that includes a view of two fillable chambers. in a dispensing position where the tube and channel are aligned with the flow duct of a fillable chamber A tube 13 may be fluidly connected to the support cup channel 9 and extend away from the support cup 5 so that, when the dispenser is engaged to the storage container 3, the tube 13 extends down into the storage container's interior. The tube 13 may be monolithic with the support cup 5, or the tube may be separate and affixed to the support cup 5. A first fluid seal may be located at a top of the channel 9 to fluidly seal the channel 9 to a flow duct of the measurement cup, and a second seal may be located at a bottom of the channel 9 to fluidly seal the tube 13 to the support cup channel 9.

Turning again to FIG. 4, in the cross-sectional view of the dispenser's fillable chambers, the left-most chamber has been rotated into a dispensing position where the tube 13 and channel 10 are aligned with the flow duct of the left fillable chamber. This dispensing position means that the left fillable chamber is selected as the dispenser's active chamber and the dispenser will fill the left fillable chamber when the dispenser is used. In contrast, the right fillable chamber is unselected because it has not been rotated into a dispensing position where the right fillable chamber flow duct is in alignment with a channel and tube. This means that when the dispenser is used, the unselected right fillable chamber will not fill with fluid.

Referring back to FIGS. 1 and 4, the fluid dispenser 1 dispenses fluid when a volume of the storage container 3 is reduced by constriction of the squeezable storage container 3. The reduced volume pushes fluid up the tube 13, channel 10, and flow duct 27 from the storage chamber of the storage container 3 to the fillable chamber 19 via the fluid flow passage 28. The fluid first fills the retained volume 41 of the fillable chamber 19 before the height of the fluid surpasses the height of the flow duct 27. When the height of the fluid surpasses the height of the flow duct 27, the fluid continues to fill the fillable chamber 19 to form an excess volume 43. The excess volume 43 is defined as all fluid within a fillable chamber 19 beyond the maximum retained volume 41.

When the constriction of the storage container 3 is relaxed, the volume of the storage container 3 is increased, and all excess volume fluid 43 flows back down from the fillable chamber 19 into the storage container 3 via the flow duct and the fluid passage 28. Only excess volume fluid 43 flows down into the storage container 3 via the flow duct, and the retained volume 41 of fluid does not flow back down, because the retained volume 41 is trapped within the fillable chamber 19 below or at the height of the flow duct 27. That is, fluid that is below or at the height of the flow duct does not have a path down into the storage container 3. Rather, the flow duct may only allow fluid located above a height of the flow duct to flow down into the flow duct and back into the storage container 3. In this way, the height of the flow duct and the geometry of the fillable chamber may define a maximum retained volume of each fillable chamber.

Figure 6:
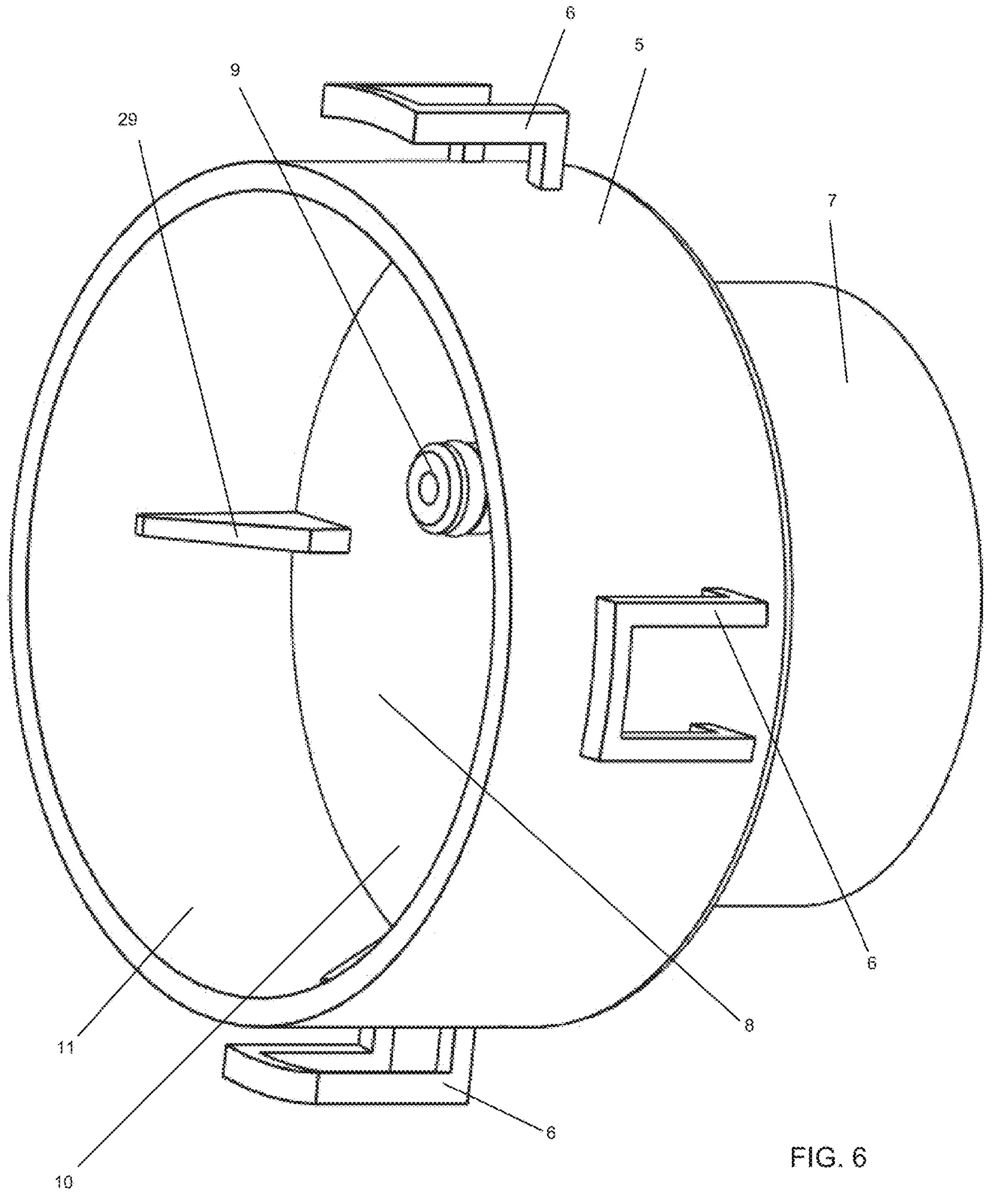
FIG. 6 is a top perspective view of an embodiment of the support cup used in the disclosed fluid dispenser.

Referring now to FIG. 6, the support cup 5 may include a bottom surface 8 and a wall 11 extending from the bottom surface 8 away from an interlocking structure 7 to form a receiving chamber 10. A channel 9 may extend through the bottom surface 8 of the support cup 5 and provide a fluid passage through the bottom surface 8. An interlocking structure 7 may be attached to or integral with the support cup 5.

The interlocking structure 7 may be configured to engage with the neck of the storage container 5 to maintain a position of the support cup 5 relative to the squeezable storage container. The interlocking structure 7 may take the form of a screw, clamp, rivet, snap lock, friction-fitting, adhesive or any other means of fluidly connecting objects as known in the art. The interlocking structure 7 may be integral with or attached to a support cup 5.

The support cup 5 may include alignment features like struts 29, notches, catches, friction stops, or grooves 30 on the interior of the support cup. An alignment feature may correspond to a fillable chamber 19 and may designate a dispensing position. In an embodiment, alignment struts 29 may be spaced at intervals around the internal perimeter of the receiving chamber 10 and take the form of diagonal struts 29 which connect the bottom surface of the support cup 5 to the support cup outer wall 11 extending from the support cup bottom surface 8. A catch, notch, or stop (not shown) may be shaped and positioned to allow the alignment struts 29 to disengage from the alignment grooves 30 in a vertical direction without the measurement cup 15 becoming unnested within the support cup 5.

A catch or stop (not shown) may be included in the support cup 5 to prevent the measurement cup 15 from fully un-nesting within the support cup 5 during rotation of the measurement cup 15 within the support cup 5. The bottom surface 8 of the support cup 5 may include an alignment receptacle (not shown) configured to receive the alignment ring 33 of the measurement cup 15 so that the measurement cup 15 is centered within the support cup 5 when the measurement cup 15 is nested within the receiving chamber 10 of the support cup 5.

The support cup 5 may be formed out of a single monolithic piece of material. The material forming the support cup may be a plastic, polymer, rubber, wood, metal, or any other suitable material.

The connection between the dispenser 1 and the storage container 3 may be air-tight to prevent air from leaking out between the dispenser 1 and the storage container 3. This airtight seal may allow the fluid dispenser to dispense fluid more efficiently with less effort (i.e., less squeezing pressure applied to the storage container) by the apparatus user. The measurement cup 15 may be nested within the support cup 5. A first seal 14 may be placed between the measurement cup and the support cup to prevent fluid leakage between the cups. The support cup 5 may include an interlocking structure 7 that allows the dispenser 1 to connect to the neck of a storage container 3.

To provide sealing functionality between the storage chamber and measurement chamber, the adjustable measured fluid dispenser may include one or more suitable seals. For example, a gasket or O-ring seal may be disposed in a groove of the measurement cup or the storage cup.

Figure 8:
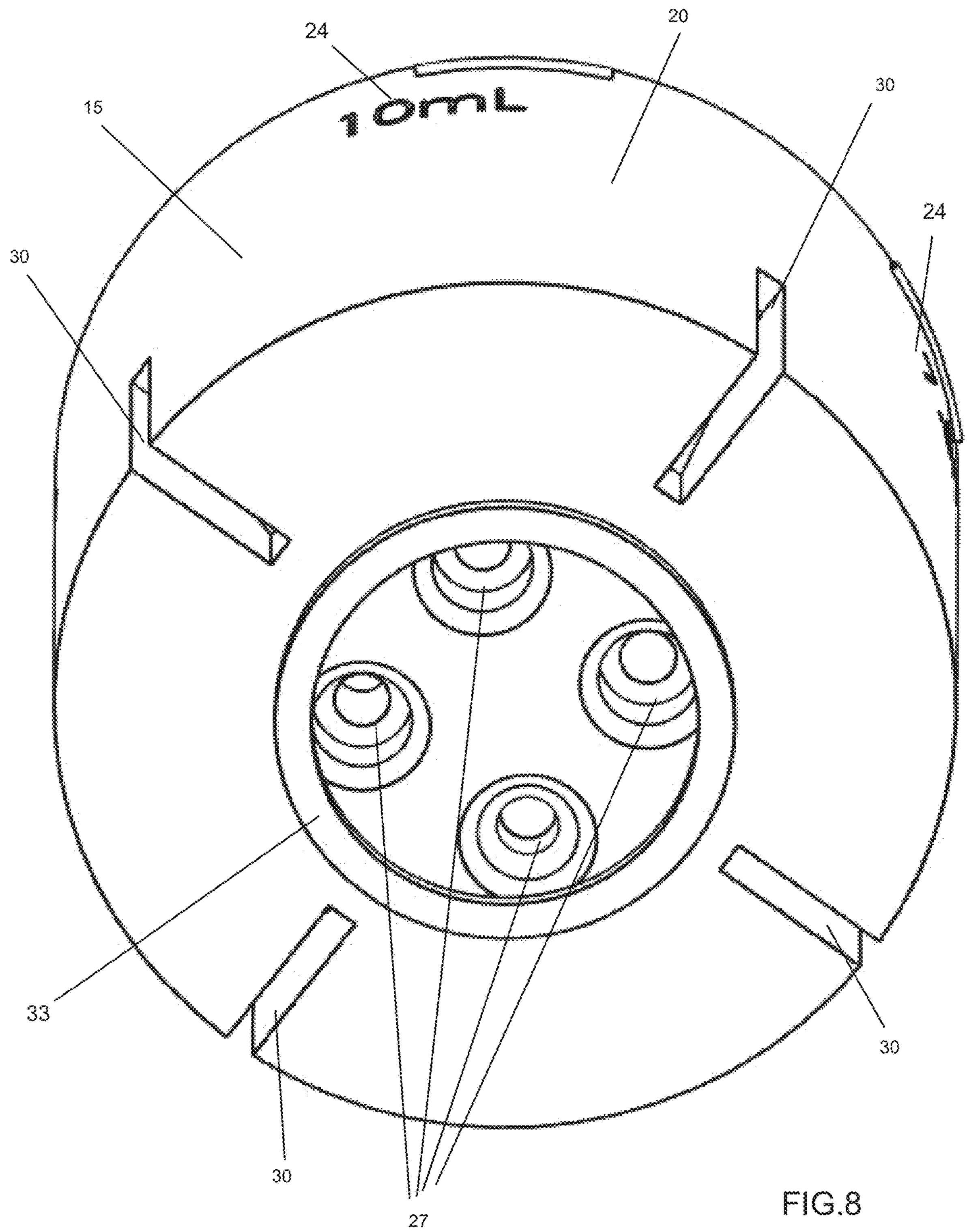
FIG. 8 is a bottom perspective view of the measurement cup of FIG. 7.

Referring now to FIGS. 6 and 8, the bottom of the flow ducts 27 on the bottom side of the measurement cup 15 (located within the alignment ring 33) is configured to rotationally align with the channel 9 of the support cup at each dispensing position.

Figure 7:
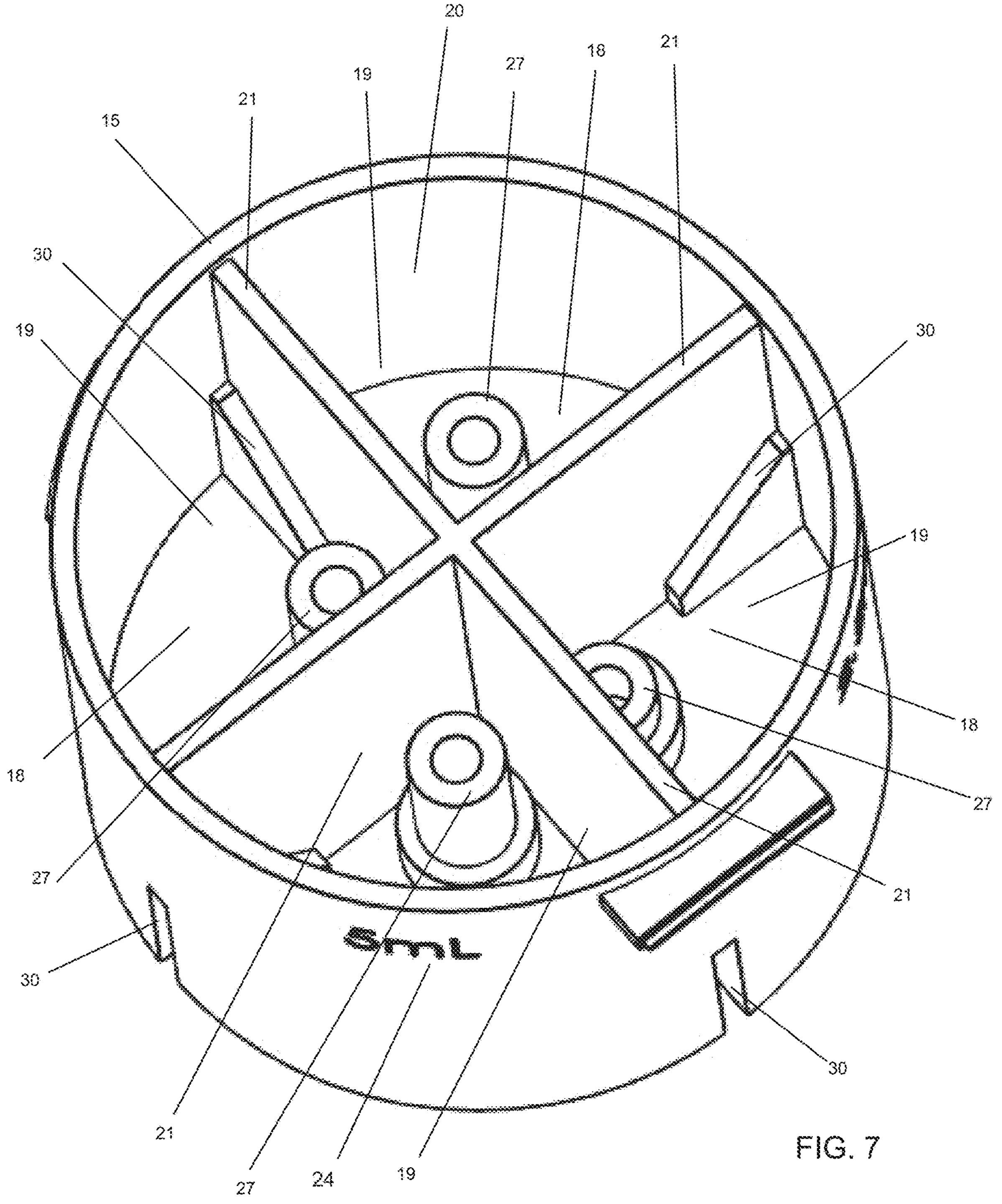
FIG. 7 is a top perspective view of an embodiment of the measurement cup used in the disclosed fluid dispenser.
Figure 9:
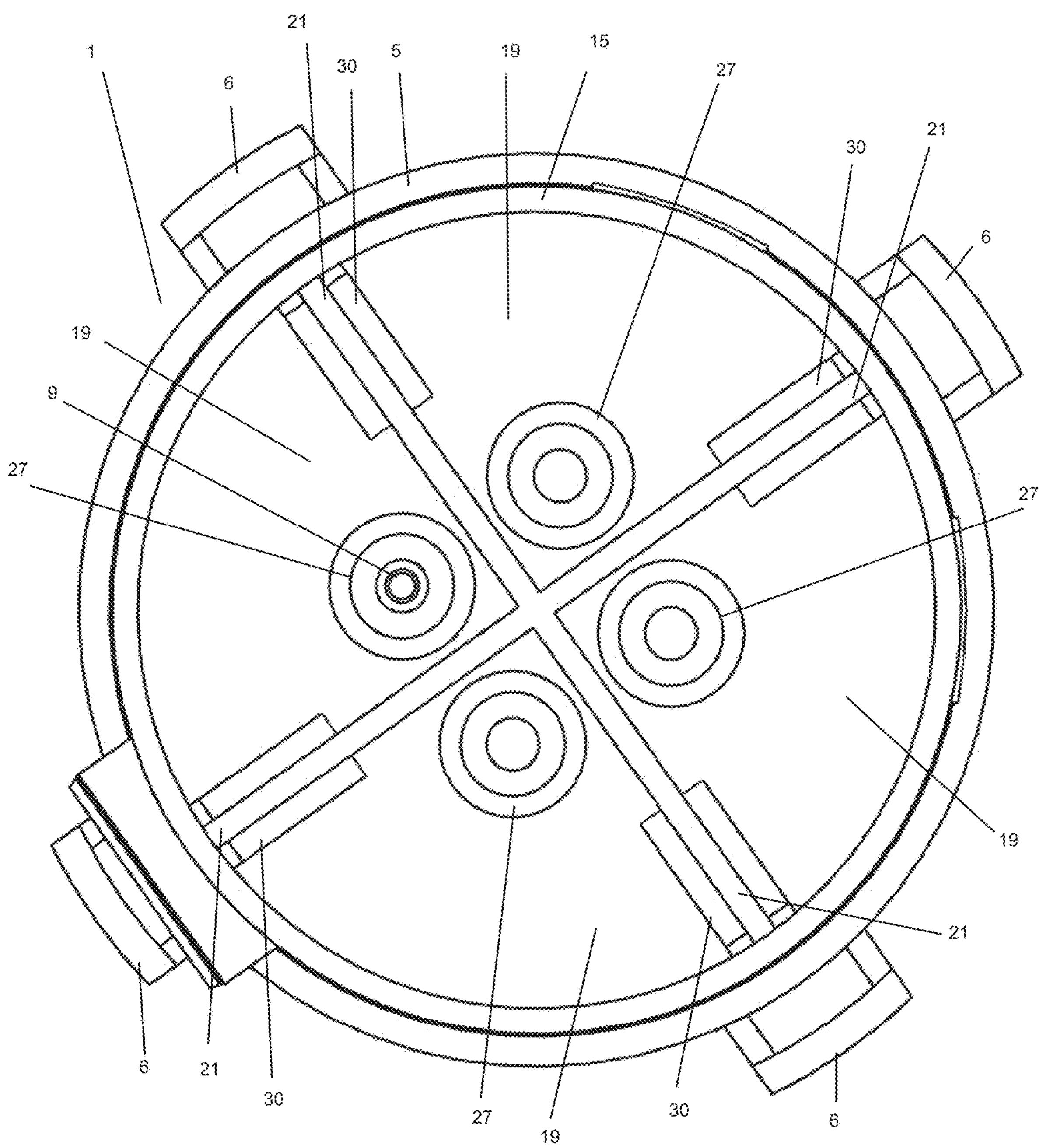
FIG. 9 is top view of the measurement cup of FIG. 7.
Figure 10:
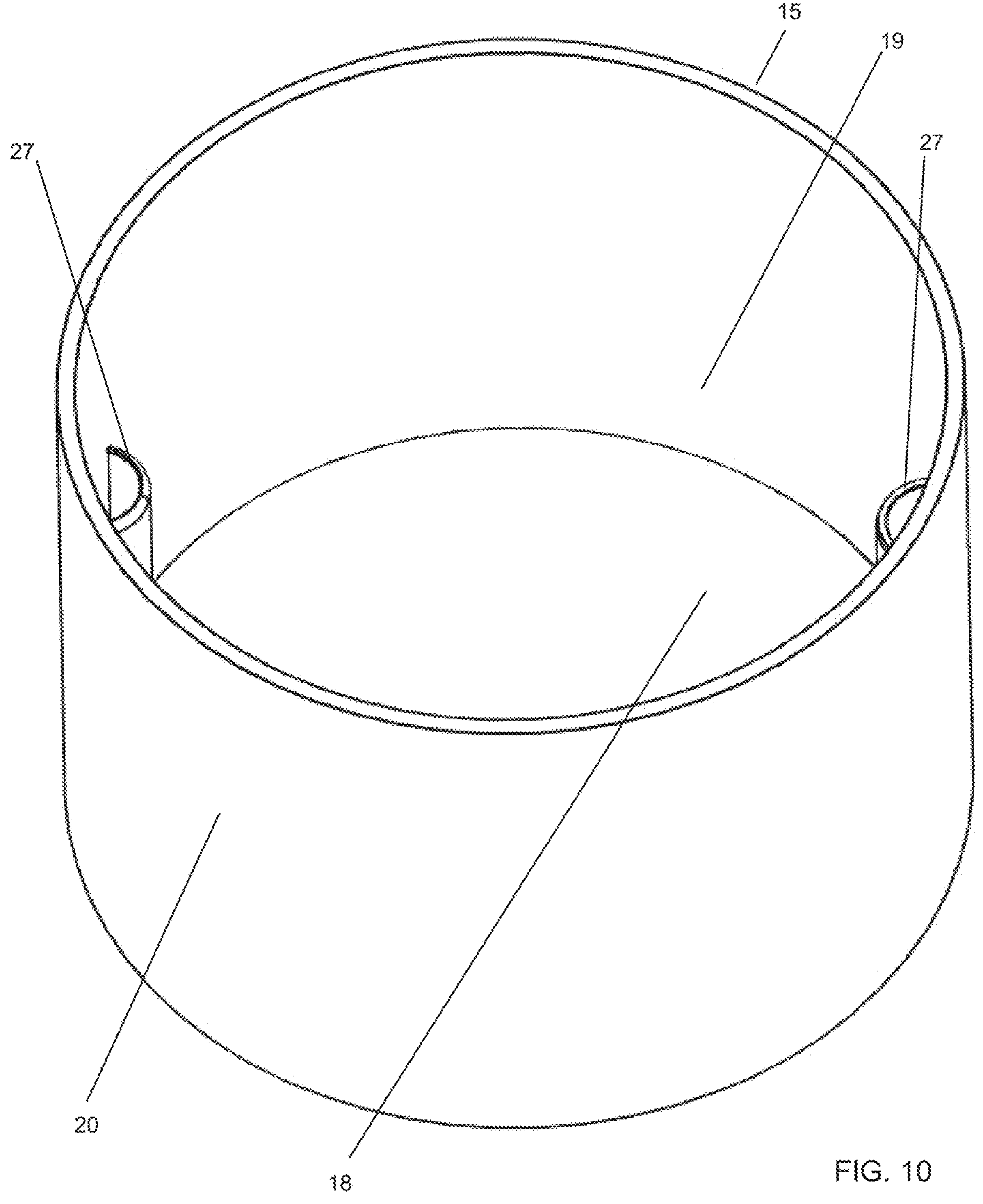
FIG. 10 is an elevated perspective view of the top of an embodiment of the measurement cup dispenser component wherein the measurement cup includes only one fillable chamber, and the flow ducts are partially formed by the outer wall of the measurement cup.
Figure 11:
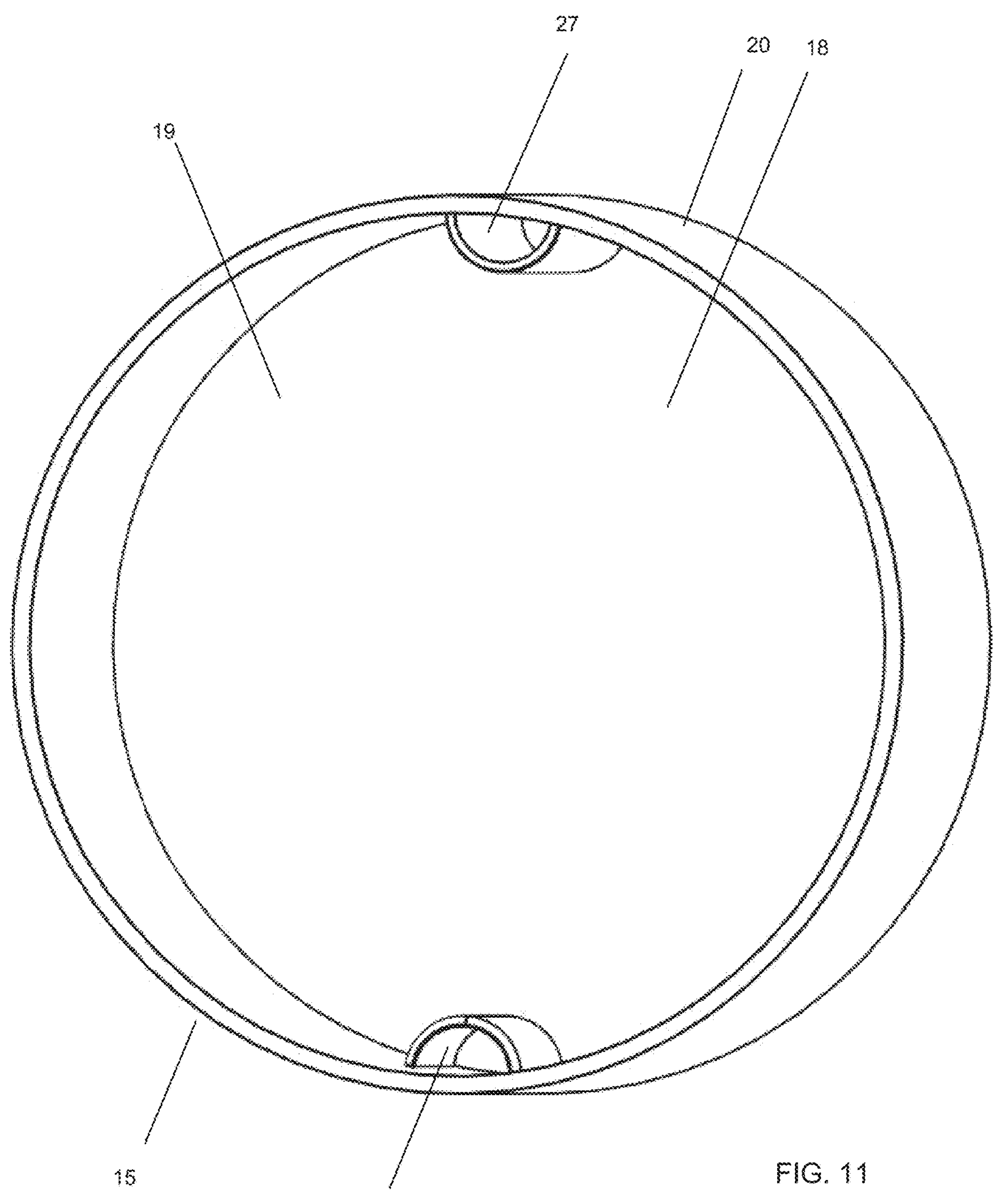
FIG. 11 is a top perspective view of the measurement cup of FIG. 10.
Figure 12:
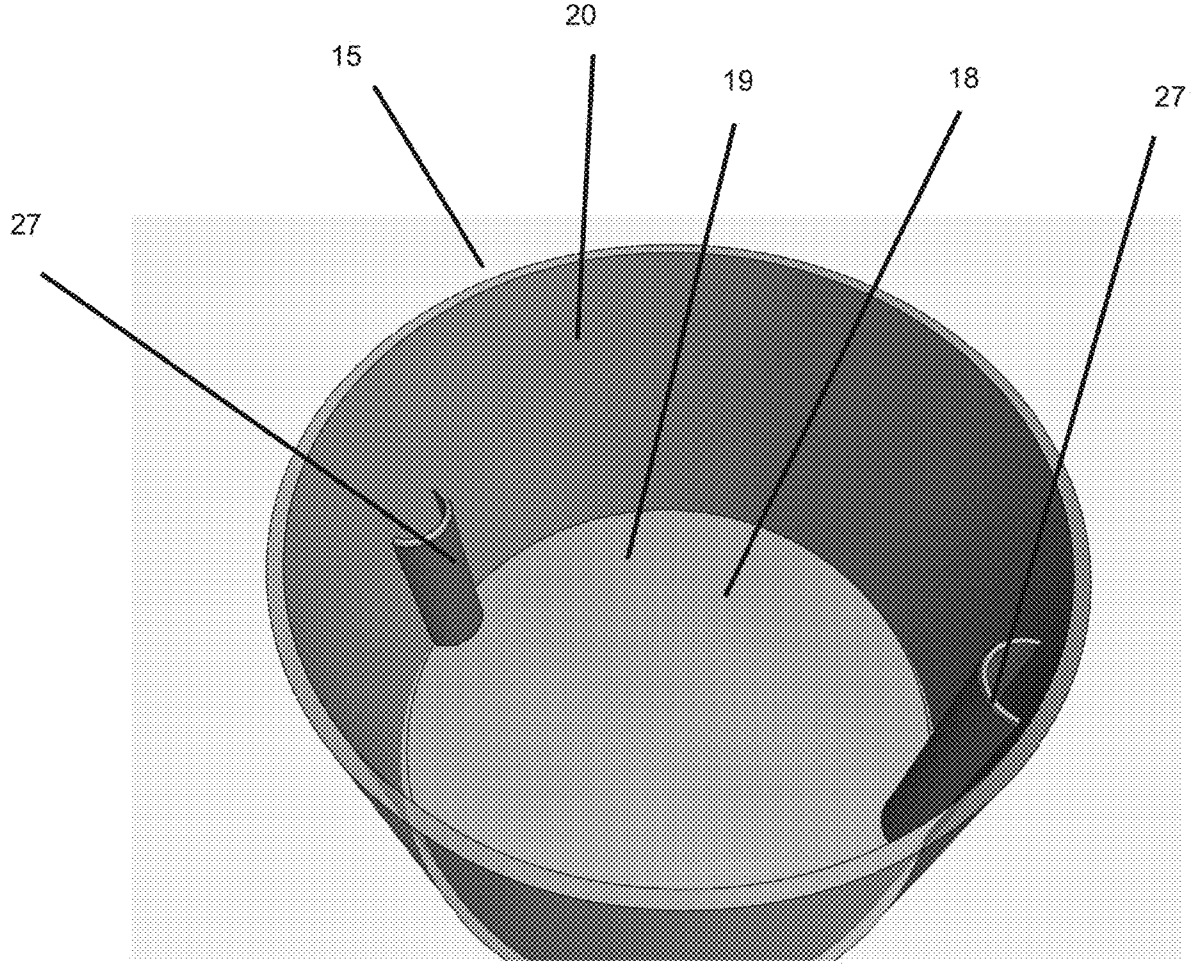
FIG. 12 is a top perspective view of a measurement cup with multiple different height flow ducts in the same fillable chamber.
Figure 13:
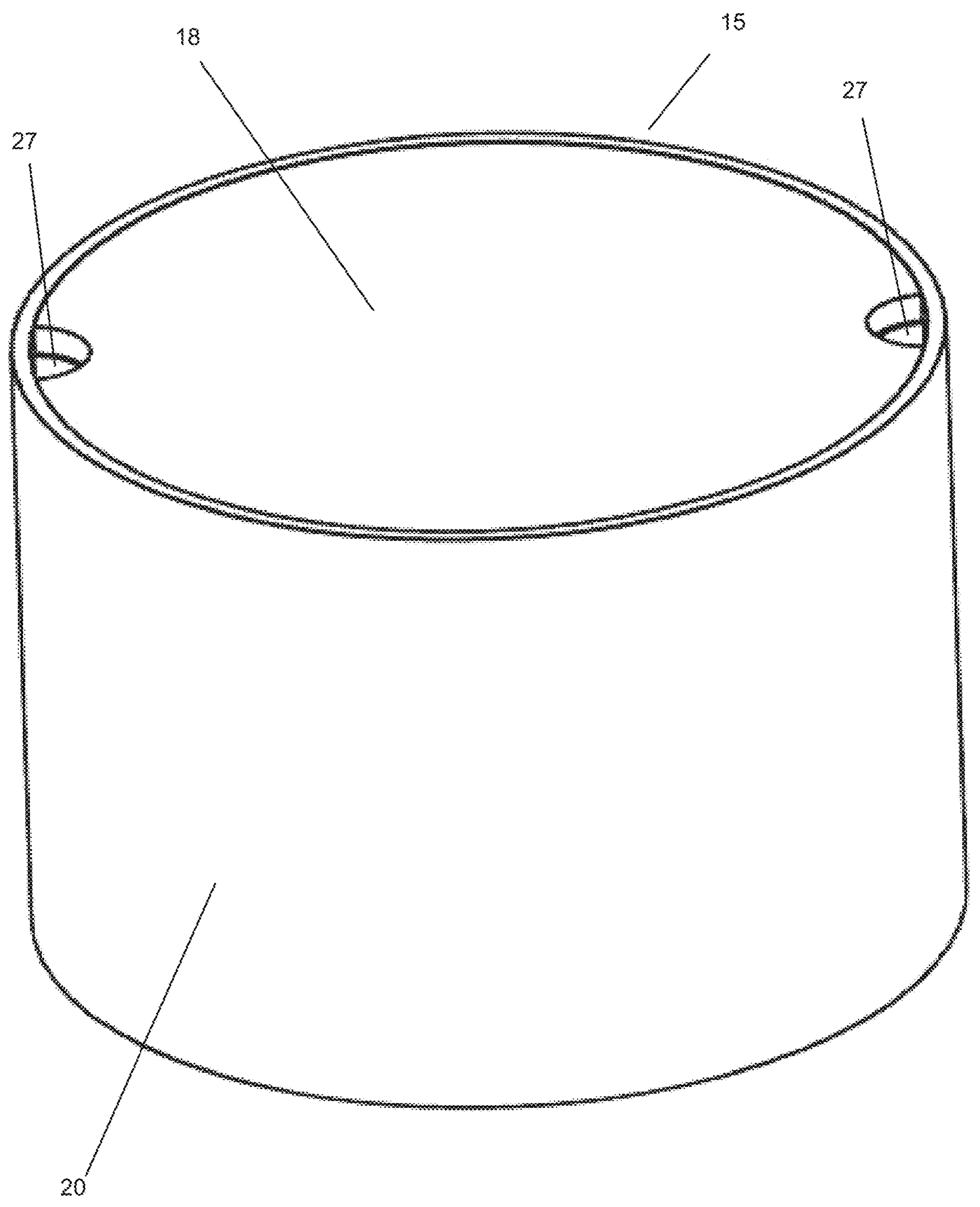
FIG. 13 is an elevated perspective view of the bottom of the measurement cup of FIG. 10.

Referring now to FIGS. 7-9, the measurement cup 15 may include a floor 18, outer walls 20 extending from the floor, a measurement chamber 17 defined by the floor 18 and the outer walls 20, and a dividing wall 21 which separates the measurement chamber 17 into fillable chambers 19 within the measurement chamber 17. Optionally, the dividing walls 21 may be excluded and the measurement cup 15 may have only one fillable chamber 19 defined by the measurement chamber 17. The measurement cup 15 may be formed out of a single monolithic piece of material. The material forming the measurement cup 15 may be a plastic, polymer, rubber, wood, metal, or any other suitable material.

In an embodiment, a magnet (not shown) may be attached to or integral with the support cup 5 and measurement cup 15 so that the position of the magnets determines the rotational alignment of each dispensing position. To rotate the measurement cup 15 within the support cup 5, the user of the fluid dispenser 1 must apply a rotational force to overcome the magnetic attraction force between the support cup magnet and the measurement cup magnet. The measurement cup 15 is then rotated to another dispensing position where the magnets associated with that dispensing position attract each other and pull the measurement cup into alignment at the dispensing position to form a fluid flow passage 28.

In an embodiment, the measurement cup 15 may have one, two, three, or four fillable chambers 19 that are separate from each other. In another embodiment, the measurement cup 15 may have more than four fillable chambers 19. The exterior of the measurement cup 15 may have catches or hinges 6 to allow a lid to fit over top of the measurement cup 15. Optionally, the dividing walls may be excluded and the measuring cup may have only one fillable chamber defined by the measurement chamber 17.

The exterior bottom of the measurement cup 15 may include a groove (not shown) that is shaped to wholly or partially contain a second seal 31. The measurement cup exterior bottom may include a central alignment ring 33 that centers the measurement cup 15 within the support cup 5 when the measurement cup 15 is nested within the support cup 5. The alignment ring 33 may encircle the bottom openings of the flow ducts 27 that are held within the measurement chamber 17 or fillable chambers 19.

A catch or stop (not shown) may be included on the exterior of the measurement cup 15 to prevent the measurement cup 15 from fully un-nesting from the support cup 5 during rotation of the measurement cup 15 within the support cup 5.

The measurement cup 15 may include an overflow passage (not shown) attached to or integral with the measurement cup outer wall 20 that connects to either the receiving chamber 10 of the support cup 5, the fluid flow passage 28 of the fluid dispenser in a dispensing position, or the interior of the storage container 3. The overflow passage may be configured so that when an amount of fluid in excess 43 of the maximum retained volume 41 enters the measurement cup, all or a portion of the excess fluid is directed into the overflow channel and flows back into the storage container 3.

Alignment struts 29, grooves 30, notches, catches, or friction stops may be included within or on the interior of the support cup 5 and the exterior of the measurement cup 15 to indicate to the user of the fluid dispenser 1 when the rotation of the measurement cup 16 has reached a dispensing position that aligns a flow duct 27 with the fluid dispenser's channel 10 and tube 13 to form a fluid passage 28. In one embodiment, the support cup 5 includes alignment struts 29 that extend from a wall 11 of the support cup 5 to a bottom surface 8 of the support cup 5, and an outer wall 20 of the measurement cup 15 includes alignment grooves 30 formed to match the shape of the alignment struts 29 in the support cup 5. The location of the alignment grooves 30 and alignment struts 29 may determine or correspond to the location of each dispensing position within the fluid dispenser 1. Optionally, a magnet may be attached to or integral with the support cup 5 and measurement cup 15 so that the position of the magnets determines or corresponds to the rotational alignment of each dispensing position.

The measurement cup 15 nests within the support cup 5 so that the alignment grooves 30 of the measurement cup 15 encompass the alignment struts 29 of the support cup 5 to determine a dispensing position that corresponds to a particular fillable chamber 19. The user of the fluid dispenser manipulates the fluid dispenser 1 to use a different dispensing position (corresponding to a different fillable chamber 19) by lifting the measurement cup 15 within the support cup 5 until the alignment grooves 30 of the measurement cup 15 no longer encompass the alignment struts 29 of the support cup 5. The user then rotates the measurement cup 15 within the support cup 5 until an alignment groove 30 corresponds with the alignment strut 29 that determines or corresponds to the dispensing position of a different fillable chamber 19, and the measurement cup 15 is lowered back within the support cup 5 so that the alignment groove 30 fully encompasses an alignment strut 29 to determine or correspond with the new dispensing position.

As shown in FIGS. 10-13, the measurement cup may include flow ducts 27 which are partially or wholly integrated with the dividing walls or outer walls 20 of the measurement cup. This integration of the flow ducts 27 with the walls of the cup may reduce the manufacturing cost of the measurement cup because the material forming the cup walls doubles as a portion of the flow duct's structure, thereby reducing the amount of material needed to produce the measurement cup.

Optionally, more than one flow duct may be included in each fillable chamber. Each flow duct may have a different height than other flow ducts in the same fillable chamber such that each distinct flow duct height corresponds to a different retained volume of fluid. Although FIGS. 10-13 illustrate an embodiment with only one fillable chamber, measurement cups with flow ducts partially or wholly attached to the dividing walls or outer walls of a measurement cup may include several fillable chambers.

In an alternative embodiment (not shown), the flow ducts may be formed integrally into the walls of the measurement cup so that the flow duct conduit is entirely contained within the dividing walls or outer walls of the measurement cup. The chamber fluid opening of the flow duct issues out through an interior surface of the measurement cup's walls, and the height of the chamber fluid opening on the wall determines the retained volume of the fillable chamber.

A combination of an umbrella valve and a duckbill valve may be included at the bottom of a flow duct 27. In an embodiment (not shown), an umbrella valve allows fluid to flow into the fillable chamber through the aligned flow duct when positive pressure is applied to the valve via compression of the fluid container. When the fluid container's compression is relaxed, the duckbill vale activates allowing the overflow of fluid above the flow duct to drain back into the bottle via the fluid flow passage while keeping the inactive tubes sealed.

The inter-wall flow ducts may be formed by any appropriate method known in the art, including milling out the channel from the cup walls with a drilling apparatus or injection molding the measurement cup with cores or pins temporarily occupying where the channel will exist in the completed measurement cup.

Figure 14:
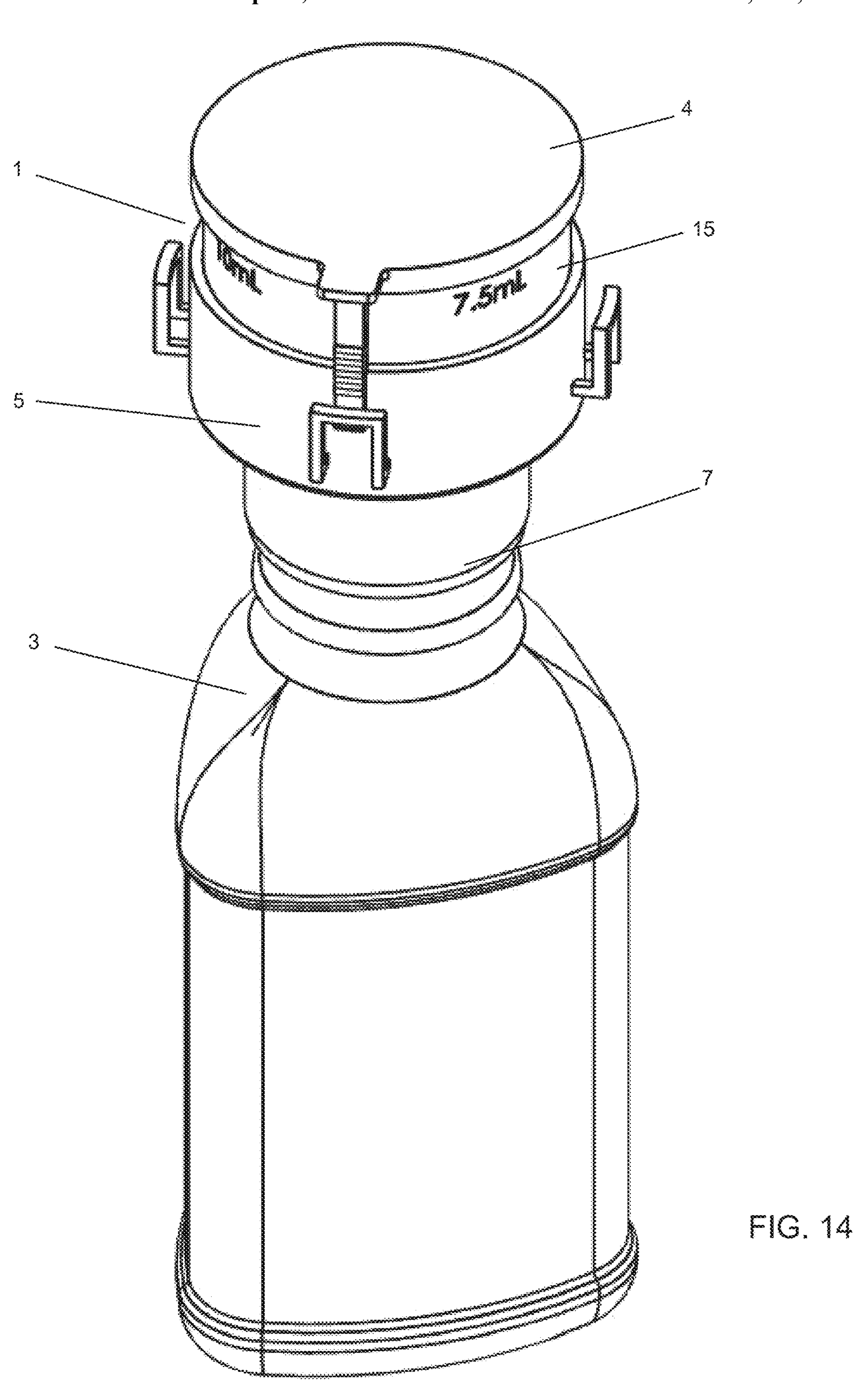
FIG. 14 is an elevated perspective view of an embodiment of the adjustable liquid medicine dispenser including an adjustable measured fluid dispenser with lid and a storage container.

Referring now to FIG. 14, a lid 4 may cover the measurement cup 15 to keep the measurement cup clear and clear of debris. Lid catches 6 may be positioned on the exterior of the dispenser 1 to attach the lid 4 to the dispenser 1. The interior or exterior of the measurement cup 15 may be inscribed or marked with volume measurement notations 24, and an interior surface of the measurement cup 15 may be inscribed with markings that denote the volumes of the measurement cup's interior fillable chambers 19.

Referring to no particular figure, a method of using the dispenser may include a first step of obtaining a dispenser attached to or integral with a fluid storage container. Then, the user may lift the measuring cup up from within its nest inside the support cup and may rotate the measuring cup to a dispensing position. The user may lower the measuring cup back into its nest inside the support cup so that the channel is aligned with a duct, and then may apply a constricting pressure to the storage container until a portion of the fillable chamber in excess of the retained volume is filled with liquid. Once the fillable chamber has been filled in excess of the retained volume, the user may relax the constricting pressure to the storage container until all liquid in excess of the retained volume is drained by gravity through the duct back into the storage container.

Optionally, the method of using the dispenser may include the additional step of attaching the claimed dispenser to a medicine bottle.

Optionally, the method of using the dispenser may include the additional steps of determining a desired amount of fluid to be dispensed from the container, may include the step of observing markings on the fluid dispenser which designate a fillable chamber as corresponding to the desired amount of fluid, and then may include the step of rotating the measurement cup so that the designated fillable chamber is the chamber rotated into the dispensing position.

In an alternative embodiment, the method of using the dispenser may include a first step of applying a rotational force to the measurement cup to overcome a magnetic force asserted by the magnets attached to or integral with the support cup and measurement cup. The user may then rotate the measuring cup to a dispensing position where the magnet attached to or integral with the support cup aligns with the magnet attached to or integral with the measurement cup. The apparatus user then applies a constricting pressure to the storage container until a portion of the fillable chamber in excess of the measuring volume is filled with liquid, and relaxes the constricting pressure to the storage container until all liquid in excess of the measuring volume is drained by gravity through the duct back into the storage container.

In the discussion above, the terms "upper", "lower", "top", "bottom," "end," "inner," "left," "right," "above," "below," "horizontal," "vertical," etc. refer to the measured fluid dispenser as viewed in a horizontal position, as shown in FIG. 1, for example. Such relative positional terms as used in this disclosure are understood to refer to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An adjustable measured fluid dispenser for dispensing a fluid from a storage chamber of a squeezable storage container via a neck of the storage container, the fluid dispenser comprising:

- a support cup with an interlocking structure configured to engage with the neck of the storage container to maintain a position of the support cup relative to the squeezable storage container, the support cup having:
  - a bottom surface;
  - a wall extending from the bottom surface away from the interlocking structure;
  - a receiving chamber formed by the bottom surface and the wall; and
  - a channel extending through the bottom surface of the support cup and providing a fluid passage through the bottom surface and into the receiving chamber;
- a tube configured to be fluidly coupled to the channel, such that the tube extending away from the support cup into the storage chamber when the support cup is engaged with the neck of the storage container;
- a measurement cup configured to be nested within the receiving chamber of the support cup, such that the measurement cup is rotatable within the receiving chamber;
- wherein the measurement cup includes a floor, outer walls extending from the floor, a measurement chamber defined by the floor and the outer walls, and a dividing wall separating divided fillable chambers within the measurement chamber;
- wherein each of the fillable chambers:
  - includes a flow duct having a chamber fluid opening located at a height in the fillable chamber, an external fluid opening, and a flow conduit extending between and fluidly connecting the external fluid opening and the chamber fluid opening, the flow duct providing a fluid passage into the fillable chamber via the external fluid opening; and
  - has a maximum retained volume defined by the height of a location of the chamber fluid opening of the flow duct;
- wherein the measurement cup is configured to rotate within the receiving chamber of the support cup between at least two different dispensing positions;
- wherein each of the dispensing positions is associated with one of the fillable chambers, such that the external fluid opening of the flow duct of the associated fillable chamber aligns with and fluidly connects the channel of the support cup and the associated fillable chamber via the chamber fluid opening; and
- wherein, when the measurement cup is rotated to a selected dispensing position of the dispensing positions, when the support cup is engaged with the neck of the storage container, and when the tube is fluidly coupled to the channel:
  - a fluid flow passage is defined from the storage container to the associated fillable chamber of the selected dispensing position via the tube, the channel of the support cup, and the flow conduit of the flow duct of the associated fillable chamber;

when a volume of the storage chamber is reduced by constriction of the squeezable storage container, the fluid from the storage chamber flows from the storage chamber to the fillable chamber via the fluid flow passage; and when a volume of the fluid in the associated fillable chamber exceeds the maximum retained volume of the associated fillable chamber and the volume of the storage chamber is no longer reduced, the fluid in the associated fillable chamber flows back through the flow passage into the storage chamber.

2. The adjustable measured fluid dispenser according to claim 1, wherein the measurement cup and the support cup are each monolithic and individually formed out of a single piece of material.

3. The adjustable measured fluid dispenser according to claim 1, wherein the fillable volumes include at least two divided fillable chambers.

4. The adjustable measured fluid dispenser according to claim 1, wherein:

the measurement cup includes an exterior bottom surface with an alignment ring; and the bottom surface of the support cup includes an alignment receptacle configured to receive the alignment ring so that the measurement cup is centered within the support cup when the measurement cup is nested within the receiving chamber of the support cup.

5. The adjustable measured fluid dispenser according to claim 1, wherein the flow duct is partially formed by the dividing wall or outer wall of the measurement cup.

6. The adjustable measured fluid dispenser according to claim 1, wherein:

the flow duct includes a flow duct body extending from the floor of the fillable chamber with the chamber fluid opening located on the flow duct body distal from the floor of the fillable chamber; or the flow conduit of the flow duct is located within the outer walls or the dividing wall of the measurement cup.

7. The adjustable measured fluid dispenser according to claim 1, wherein a seal is positioned between the channel of the support cup and at least one of the flow ducts of the measuring cup.

8. The adjustable measured fluid dispenser according to claim 1, wherein the support cup includes alignment struts that extend from the support cup walls to the bottom surface of the support cup;

and wherein the outer walls of the measurement cup include alignment grooves formed to match the shape of the alignment strut;

wherein the positioning of the alignment strut determines the dispensing positions of the measurement cup's rotation within the support cup.

9. The adjustable measured fluid dispenser according to claim 8, wherein the dispenser includes a catch configured to allow the alignment struts to disengage from the alignment grooves in a vertical direction without the measurement cup becoming unnested within the support cup.

10. The adjustable measured fluid dispenser according to claim 1, wherein each retained volume is different from each other retained volume.

11. The adjustable measured fluid dispenser according to claim 1, wherein, for each of the fillable volumes, the surfaces of the fillable volume include a hydrophobic coating.

12. The adjustable liquid medicine dispenser according to claim 1, wherein the measuring cup includes an overflow passage that connects to the storage container, and is configured so that:

when an amount of fluid in excess of the maximum retained volume enters the measurement cup, fluid is directed from the fillable chamber into the overflow channel and flows back into the storage container.

13. The adjustable liquid medicine dispenser according to claim 1, wherein the tube is monolithic with the support cup and is formed out of the same piece of material as the support cup.

14. The adjustable liquid medicine dispenser according to claim 1, wherein the dispenser is formed of less than 6 monolithic pieces.

15. The adjustable liquid medicine dispenser according to claim 1, wherein the dispensing positions are defined by magnets located on or within the support cup and measurement cup.

16. A method of dispensing fluid from the measured fluid dispenser according to claim 15 comprising:

applying a rotational force to the measurement cup to overcome a magnetic force asserted by the magnets attached to or integral with the support cup and measurement cup;

rotating the measuring cup to a dispensing position where the magnet attached to or integral with the support cup aligns with the magnet attached to or integral with the measurement cup;

applying a constricting pressure to the storage container until a portion of the fillable chamber in excess of the measuring volume is filled with liquid; and relaxing the constricting pressure to the storage container until all liquid in excess of the measuring volume is drained by gravity through the duct back into the storage container.

17. The adjustable liquid medicine dispenser according to claim 1, wherein the interlocking structure is configured to form an airtight seal around the neck of the storage container.

18. The adjustable liquid medicine dispenser according to claim 1, wherein the fillable chambers all have the same maximum volume;

each duct has a respective height relative to the bottom surfaces of the fillable chambers;

each duct height is different from the height of the other respective ducts; and the retained volume of the fillable chambers is determined by the height of each respective duct.

19. A method of dispensing fluid from the measured fluid dispenser according to claim 1 comprising:

lifting the measuring cup up from within its nest inside the support cup;

rotating the measuring cup to a dispensing position;

lowering the measuring cup back into its nest inside the support cup so that the channel is aligned with a duct;

applying a constricting pressure to the storage container until a portion of the fillable chamber in excess of the retained volume is filled with liquid; and relaxing the constricting pressure to the storage container until all liquid in excess of the retained volume is drained by gravity through the duct back into the storage container.

20. The method of claim 19, further comprising the steps of:

obtaining a medicine bottle; and engaging the dispenser to the medicine bottle.

* * * * *